Patented June 7, 1949

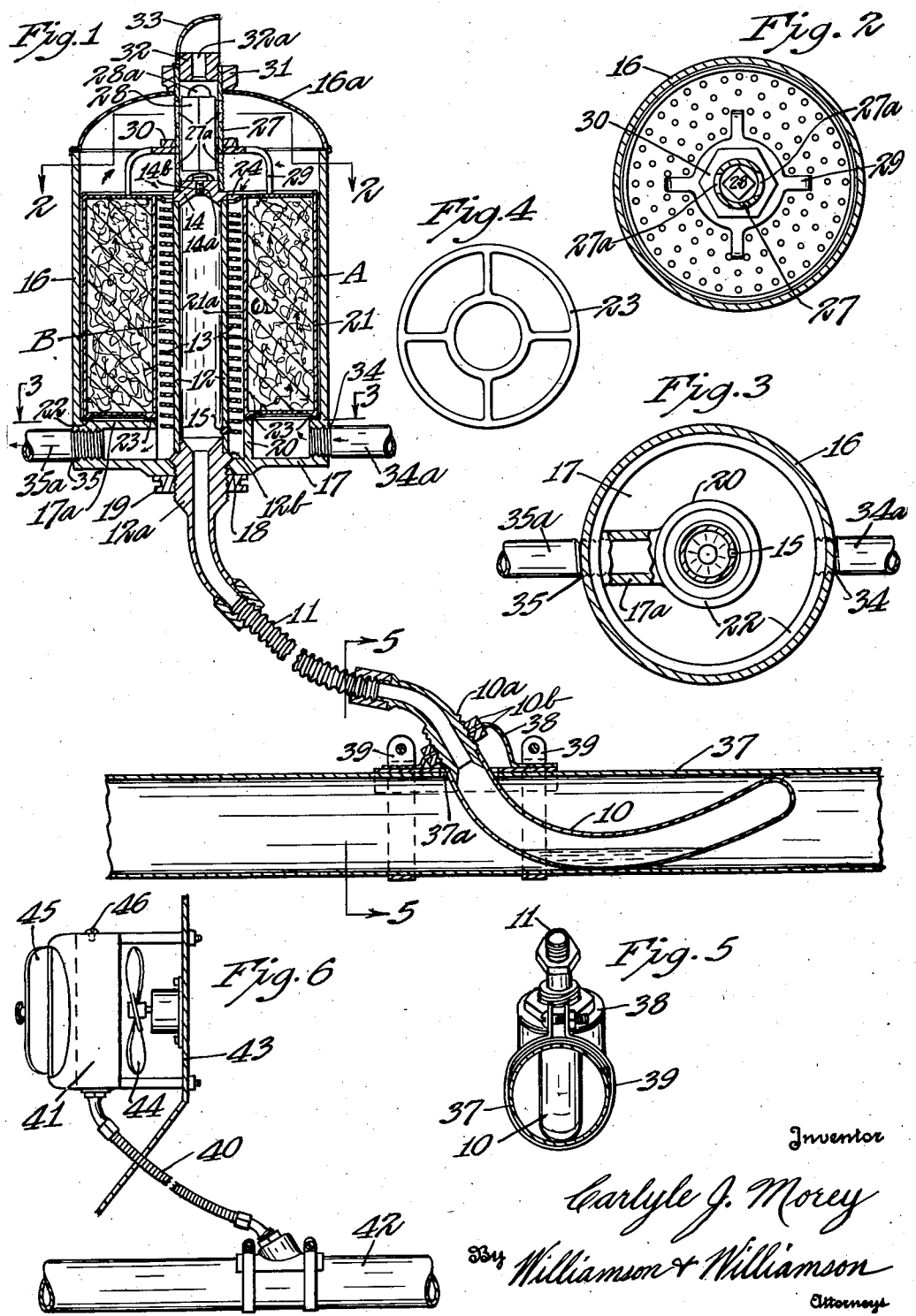

2,472,717

UNITED STATES PATENT OFFICE 2,472,717

LUBRICATING OIL PURIFIER

Carlyle J. Morey, Minneapolis, Minn.

Application April 26, 1947, Serial No. 744,133

3 Claims. (Cl. 196—16)

This invention relates to oil purifiers.

It is an object of my invention to provide a novel and improved oil purifier for use with combustion engines which will filter the oil and also heat the oil to a point where such liquid impurities as gasoline, kerosene, and water are vaporized to be driven off.

It is another object of my invention to provide a novel and improved heating system particularly adapted for use on automobile heaters and lubricating oil purifiers.

These and other objects and advantages of the invention will more fully appear from the following description made in connection with the accompanying drawings, wherein like reference characters refer to the same or similar parts throughout the views and in which:

Fig. 1 is a vertical central sectional view of an oil purifier embodying the invention showing the heat receiver connected in the exhaust system of a combustion engine;

Fig. 2 is a horizontal sectional view taken substantially on the line 2—2 of Fig. 1;

Fig. 3 is a horizontal sectional view taken substantially on the line 3—3 of Fig. 1 with the top of the outlet conduit broken away;

Fig. 4 is a detail of the gasket which seals the bottom of a filtering unit;

Fig. 5 is a vertical sectional view taken substantially on the line 5—5 of Fig. 1; and Fig. 6 is a vertical section taken through the dashboard of an automobile showing in side elevation a heat transfer system of the invention employed in an automobile heater.

Referring first to the form of my invention illustrated in Figs. 1 to 5, I provide a completely closed heat transfer system having a heat receiver such as an arcuately curved copper tube 10 closed at one end to provide a chamber therein. A coupling 10a is fixed in the open end of said arcuate tube 10 and sealed therein as by brazing, said coupling 10a having an enlarged threaded portion adapted to receive a pair of lock nuts 10b. A flexible conduit 11 is connected to the free end of coupling 10a as by brazing. I provide a heat distributing head such as tube 12 having a spiral heat conducting fin 13 integrally formed about a portion of the outer periphery of said tube 12, this fin 13 terminating a short distance above the lower end of tube 12. A coupling 12a is fixed in sealed relation in the lower end of said tube 12 and has a sealing flange 12b at the upper portion thereof. The lower end of said coupling 12a is connected as by brazing with the upper end of flexible conduit 11. A plug 14 is connected to the open end of tube 12 and has a centrally disposed aperture 14a therethrough. The aperture 14a provides an opening into the system whereby liquid may be poured therein. The procedure for filling said system is to pour in an excess of liquid such as water or alcohol and then to heat the tube 10 to a predetermined temperature to vaporize the liquid and drive off the excess of liquid, thus controlling the amount of vapor that on cooling will condense into liquid which will be retained in the system when sealed. When the desired quantity of liquid is in the system, the aperture 14a is plugged as by a screw 14b, said aperture 14a being tapped to cooperate with screw 14b to close and seal the heat transfer system. By proceeding as above described where the vapor has condensed after sealing of the system and cooling of the same, the system will be under pressure less than atmospheric pressure which is desirable to permit lower vaporization temperature of the liquid and thus reduce the pressure within the system when heated. A safety blow-out valve 15 formed of fusible metal which will melt at a fixed high temperature is provided in the bottom marginal portion of said heat distributing tube 12.

An oil purifier unit is provided having a casing 16, said casing have a removable top 16a and a bottom 17 with an aperture 18 extending through the central portion of said bottom. The heat transfer system above described is installed within said casing by inserting the tube 10 downwardly through the aperture 18 in the casing bottom 17, the tube 10, coupling 10a, conduit 11, and the lower portion of coupling 12a continuing through said aperture 18 until the sealing flange 12b comes in contact with the interior of the casing bottom 17 surrounding aperture 18. A nut 19 has an aperture therein large enough to permit it to have the tube 10, coupling 10a, and conduit 11 inserted therethrough and cooperates with exterior threads provided on coupling 12a to hold and seal said coupling 12a and heat distributing tube 12 firmly in place within the casing 16.

A filter base 20 is integrally cast on the inside of casing bottom 17, best shown in Fig. 3. An annular removable filter unit 21 in cartridge form and containing filtering material, such as cotton waste, fits into said casing 16, the bottom of its outer periphery abutting against a filter seat 22 formed around the internal periphery of said casing 16. The ends of said filter unit are perforated. The annular filter 21 has an imperforate inner wall 21a, the bottom of which abuts the top of filter base 20 to divide the lower portion of the casing into two concentric passages, an outer filtering passage A and an inner heating and refining passage B. A gasket 23 is provided to form a seal between the outer periphery of said filter unit and filter seat 22 and between the bottom of inner wall 21a and the filter base 20, maintaining the division between the bottom of filtering passage A and heating and refining passage B. An oil guiding ring 24 extends inwardly from the top of said inner wall 21a and is fixed thereto. The heat distributing tube 12 with its fin 13 is disposed centrally within said heating and refining passage B and the interior periphery of ring 24 extends inwardly over the top of fin 13.

A valve cage or sleeve 27 is removably connected to the top of sealing plug 14 as by threads on the outside periphery of said plug 14 and cooperating inside threads on the lower end of said cage 27. The entire upper portion of the outer periphery of cage 27 is threaded and a plurality of vent apertures 27a are provided in the wall of said cage. A float 28 made as from cork or other relatively light material and having a polygonal cross section is slidably confined within said cage 27. A spider clamp 29 having an aperture through the center thereof to receive said valve sleeve 27 is fitted down over the top of said valve sleeve 27 and has its prongs engaging the top perforated surface of said filter unit 21 to hold the said filter unit 21 down tightly against its supports. A spider hold-down nut 30 is threaded onto the valve sleeve 27 and holds said spider 29 tightly down against the top of said filter 21.

A valve seat 32 is fixed in the top of said valve sleeve 27 and has a vent aperture 32a centrally disposed therethrough and a hood 33 fixed over the top thereof. Float 28 at its upper end carries a valve 28a which is adapted to cooperate with seat 32 and seal off vent aperture 32a when the liquid within casing 16 rises above a predetermined level to prevent said liquid from flowing out through vent aperture 32a. The casing cover 16a having a centrally disposed aperture therein is fitted down over said hood and the upper portion of said valve sleeve and is sealed against the top casing 16 as by a gasket. A cover hold-down nut 31 is threaded onto the top outwardly extending portion of valve sleeve 27 and holds the cover tightly against the top of casing 16.

An oil inlet 34 is provided in the side of casing 16 adjacent the bottom thereof and communicates with the lower portion of filtering passage A through the perforated bottom of removable filtering unit 21. An oil outlet 35 is formed in the opposite side of casing 16 from inlet 34, said outlet 35 communicating with the lower part of said heating and refining passage B through a conduit 17a formed integral with casing bottom 17. The upper end of filtering passage A is of course in free communication with the upper end of heating and refining passage B.

To install my oil purifier in an automobile (not shown) the heat-receiving tube 10 is mounted in the exhaust pipe 37 from the internal combustion engine (not shown) of said automobile. This is done by cutting an aperture 37a in the top portion of said pipe 37 and inserting the arcuate tube 10 therein, the arcuate shape of tube 10 facilitating its entrance through aperture 37a and permitting the use of a longer heat receiver than would otherwise be possible. A sealing connector 38 is attached to coupling 10a as by the lock nuts 10b, said sealing connector 38 being firmly held in place surrounding aperture 37a by strap ring clamps 39 similar to ordinary hose clamps and a gasket being preferably interposed between connector 38 and pipe 37. The lock nuts 10b seal the connector 38 to said coupling 10a the clamps 39 seal the connector 38 to the exhaust pipe 37. An oil delivery pipe 34a running from the oil pump (not shown) of the engine is connected to inlet 34 while an oil return pipe 35a is connected to outlet 35 and returns the oil after passage through the purifier to the engine. The casing 16 must be mounted at a higher elevation than the heat receiving tube 10 for the heat transfer system to properly operate and permit drainage of condensed vapor from head 12 and conduit 11 into receiver 10.

*Operation*

The operation of the heat transfer system is substantially as follows:

When the combustion engine is running, the exhaust gases therefrom heat the heat-receiver 10 which vaporizes the liquid contained therein. This hot vapor rises through conduit 11 into heat distributing head 12. As heat from this vapor is absorbed and given off to oil passing down over fins 13, the vapor condenses and runs back into the heat receiver 10 to be revaporized.

The oil passes in through inlet 34 and up through the filtering passage A in the filtering unit 21, the gasket 23 and the inner and outer filter walls confining the flow through said filtering passage A. Solid impurities in the oil are thus filtered out by filter unit 21. The oil then passes out through the perforated top in said filtering unit 21 and runs inwardly toward the center over the oil guiding ring 24. From there it passes down onto the top of the heat-conducting fin 13 where the heating process is begun. As it passes downwardly over fin 13, the heating is continued and substantially all of the liquid impurities having a lower boiling point than oil, such as gasoline, kerosene, and water, are driven off and relatively pure oil passes out through the outlet 35. The gaseous impurities pass upwardly through heating and refining passage B into the space above the filtering unit 21 and out through apertures 27a in valve cage 27 into the space between the sides of float 28 and the interior wall of cage 27 and ultimately through aperture 32a and out into the surrounding air, hood 33 being preferably rearwardly directed relative to the travel of the automobile.

If for any reason oil is supplied above the filter unit 21 faster than it can drain away through outlet 35, the float 28 will rise with oil until valve 28a seats against its seat 32, thereby closing off the vent aperture 32a confining the oil within said purifier. This prevents the overflow of oil from the purifier.

The purifying action of the device will take place at low and normal speeds of the engine. If the engine is run at very high speed, the pump will supply a much greater quantity of oil under pressure to the purifier than will be drained off by gravity through the purifier. Also as the engine is run at high speed, the pressure, due to the heat of the exhaust gases, in the closed heat transfer system would be excessive unless checked. At high speed of the engine, the supplying of the oil faster than the oil can be drained from the purifier will cause the level of oil in the casing 16 to raise above the filter cartridge 21, thereby causing float valve 28a to seat against seat 32a and causing the oil to fill passage B. The oil filling passage B rapidly carries off the heat from the finned tube 12, thereby preventing excessive pressures in the closed heating system from being developed when the engine runs at high speed.

In Fig. 6 I have shown a modified form of the invention consisting of an automobile heater. In this device there is employed a heat transfer system 40, which is similar in all respects to the heat transfer system previously described with the exception that a cellular radiator 41 of the type commonly employed in automobile heaters is substituted as the heat distributing head of the system for the finned heat distributing tube 12 of the previously described construction. The heat receiver of the system shown in Fig. 6 is connected to the automobile exhaust pipe 42 as has been previously described. The radiator 41 may be mounted on the dashboard 43 of the automobile in the usual fashion and a motor driven fan 44 suitably mounted will be employed behind radiator 41 to drive the air to be heated therethrough, a deflector 45 of the usual type being preferably provided to direct the heated air to the point desired. The radiator 41 will be equipped with a filling plug 46 similar in operation to the previously described plug 14b.

It will be seen that a highly efficient, inexpensive, and practical heat transfer system has been provided which is adapted to safely and without danger of leakage transfer heat from the exhaust line to a desired use either in an oil filter or for heating a car or for other purposes. I have also provided an improved and highly efficient oil purifying unit which is adapted to drive off liquid impurities from the lubricating oil of an engine and to filter out the solid impurities therefrom.

It will of course be understood that various changes may be made in the form, details, arrangement, and proportions of the various parts without departure from the scope of the present invention, which generally stated consists in the matter shown and described and set forth in the appended claims.

I claim:

1. An oil purifier comprising a casing having a vent opening in its upper portion and having a pure oil outlet formed in the bottom thereof, a heating and refining passage formed in upstanding relation in said casing and communicating with said oil outlet, said casing having an oil inlet adapted to supply oil to the top of said passage, a cylindrical chambered heat distributing head centrally mounted in said heating and refining passage, a conduit having one end connected in sealed relation at the bottom of said head, a chambered heat receiver adapted to be inserted in the exhaust line of an internal combustion engine to be heated by the exhaust gases thereof and having its upper portion sealingly connected to the other end of said conduit, said head, conduit, and receiver forming a closed sealed heat transfer system and there being a small quantity of liquid enclosed therein whereby when said heat receiver is heated, the liquid within said system is vaporized to heat said head and thereafter condense and return to said heat receiver for revaporization, a finned structure fixed in outstanding relation to the outside of said cylindrical head and adapted to receive oil from said oil inlet to retard the flow of the oil over said head and positively and uniformly heat said oil as it flows downwardly through said passage to drive off the volatile impurities of said oil through said vent opening, said purified oil flowing outwardly through said outlet.

2. An oil purifier comprising a casing having a vent opening in the top thereof, a filter unit fitting within said casing and having an imperforate wall dividing said casing into a filtering passage and a central heating and refining passage, said casing having an oil inlet communicating with one of said passages and an oil outlet communicating with the other passage, said passages communicating with each other above said filter wall, a heating element centrally mounted in upstanding relation in said heating and refining passage, a finned structure fixed in outstanding relation to the outer portion of said heating element to receive oil entering said heating and refining passage and retard the flow of oil over said heating element and conducting the heat therefrom outwardly to heat the oil flowing thereover and drive off the volatile impurities in said oil, the purified oil flowing outwardly through said oil inlet.

3. An oil purifier comprising a cylindrical casing having a vent opening in the top thereof, a filter unit removably received therein and having a cylindrical imperforate wall centrally formed therein to form a central heating and refining passage and a filtering passage surrounding said heating and refining passage to be heated thereby, said heating and refining passage and said filtering passage communicating above said imperforate wall, said casing having an oil inlet communicating with said filtering passage to supply oil to be purified thereto, said filtered oil flowing into said heating and refining passage, a cylindrical heating element mounted in said heating and refining passage, a continuous spiral fin surrounding the peripheral surface of said element to receive filtered oil from said filtering passage, means for heating said heating element to heat said spiral fin and the oil flowing thereover to drive off volatile impurities in said oil, said fin retarding the flow of oil thereover to permit said oil to be uniformly and adequately heated, said casing having an oil outlet formed in the bottom thereof and communicating with the bottom of said heating and refining passage to carry off the purified oil therefrom, said volatile impurities passing out through said vent opening.

CARLYLE J. MOREY.

REFERENCES CITED

The following references are of record in the file of this patent:

UNITED STATES PATENTS

| Number | Name | Date |
| --- | --- | --- |
| 1,608,571 | Watson | Nov. 30, 1926 |
| 1,705,550 | Vernet | Mar. 19, 1929 |
| 2,133,359 | Miller | Oct. 18, 1938 |
| 2,173,631 | Niedens | Sept. 19, 1939 |
| 2,219,101 | Finwall | Oct. 22, 1940 |